United States Patent [19]

Goor

[11] Patent Number: 5,184,844
[45] Date of Patent: Feb. 9, 1993

[54] INTEGRAL INFLATABLE OCCUPANT RESTRAINT SYSTEM

[75] Inventor: Dan Goor, Colorado Springs, Colo.

[73] Assignee: Goor Associates, Inc., Colorado Springs, Colo.

[21] Appl. No.: 822,272

[22] Filed: Jan. 17, 1992

Related U.S. Application Data

[63] Continuation-in-part of Ser. No. 618,397, Nov. 27, 1990, Pat. No. 5,100,169.

[51] Int. Cl.⁵ .............................................. B60R 21/18
[52] U.S. Cl. ................................... 280/733; 280/801; 280/808; 297/239
[58] Field of Search .............. 280/728, 730, 733, 801, 280/808; 297/293

[56] References Cited

U.S. PATENT DOCUMENTS

| | | | |
|---|---|---|---|
| 3,430,979 | 3/1969 | Terry et al. | 280/733 |
| 3,510,150 | 5/1970 | Wilfert | 280/733 |
| 3,706,462 | 12/1972 | Lilly | 280/733 |
| 3,706,463 | 12/1972 | Lipkin | 280/733 |
| 3,844,581 | 10/1974 | Fox | 280/733 |
| 3,866,940 | 2/1975 | Lewis | 280/733 |
| 3,883,053 | 5/1975 | Pritchard et al. | 224/264 |
| 3,905,615 | 9/1975 | Schulman | 280/733 |
| 3,971,569 | 7/1976 | Abe et al. | 280/733 |
| 3,975,037 | 8/1976 | Hontschik et al. | 280/733 |
| 4,348,037 | 9/1982 | Law et al. | 280/733 |
| 4,834,420 | 5/1989 | Sankrithi et al. | 280/728 |
| 4,946,191 | 8/1990 | Putsch | 280/730 |
| 4,971,354 | 11/1990 | Kim | 280/733 |
| 5,062,662 | 11/1991 | Cameron | 280/733 |

FOREIGN PATENT DOCUMENTS

2046426 3/1972 Fed. Rep. of Germany ...... 280/733
88/07947 10/1988 PCT Int'l Appl. ................. 280/733

Primary Examiner—Kenneth R. Rice
Attorney, Agent, or Firm—Weingarten, Schurgin, Gagnebin & Hayes

[57] ABSTRACT

An inflatable restraint system for providing protection to an occupant in a moving vehicle including a module disposed adjacent to the chest area of the vehicle occupant, the module having an airbag and an high pressure gas generator for exerting a controlled force against the occupant in a direction opposite the direction of motion of the occupant caused by rapid deceleration of the vehicle while simultaneously inflating the airbag adjacent to the occupant. A second embodiment is disclosed which includes an ancillary module disposed adjacent to the rear base of the occupant's neck, providing an airbag for inflation behind the occupant's head while simultaneously exerting a force opposite the direction of the motion of the occupant's head, as caused by the backlash forces acting against the occupant following initial impact of the occupant with a forward airbag. A third embodiment is disclosed wherein an airbag is incorporated into a child safety seat providing protection from frontal and lateral impact. A fourth embodiment is disclosed for rear seat passenger protection.

29 Claims, 8 Drawing Sheets

INTEGRAL INFLATABLE OCCUPANT RESTRAINT SYSTEM

CROSS REFERENCE TO RELATED APPLICATIONS

This invention is a continuation-in-part of patent application Ser. No. 07/618,397, filed Nov. 27, 1990, entitled "Integral Inflatable Occupant Restraint System," now U.S. Pat. No. 5,100,169.

FIELD OF THE INVENTION

The present invention relates generally to passive vehicle restraint systems and, more specifically, to an integral inflatable occupant restraint system.

BACKGROUND OF THE INVENTION

Various vehicle safety devices and passenger restraint systems are known in the art for protecting the occupants of a vehicle in the event of an accident. Most recently, automobile manufacturers have begun to provide one or more inflatable airbags in the passenger compartment of a vehicle for nearly instantaneous inflation upon rapid deceleration of the vehicle, as caused by a collision. Such airbags provide a cushioned barrier between the occupant and the fixed surroundings of the vehicle passenger compartment for absorbing the forces exerted on the occupant in the collision.

Typically, the airbags of such prior art systems are mounted in various fixed locations in the passenger compartment of the vehicle such as the steering wheel, dashboard or the back panel of a seat (for rear seat passengers). In this configuration, it is necessary for the occupant to be positioned directly in alignment with the position where the airbag is mounted in order to provide effective protection to the occupant This requirement presents a nuisance to the occupant and may actually create a safety risk in cases where the occupant is not positioned directly in front of the airbag when it is inflated.

Other inflatable safety systems have been designed for being disposed adjacent to the vehicle occupant, on a restraining belt, as shown in U.S. Pat. Nos. 3,430,979 and 3,706,462 and in the case of U.S. Pat. No. 4,834,420 a child seat. These systems are designed to provide increased mobility for the occupant while maintaining effective protection thereof by deploying an inflatable cushion adjacent to the occupant in the event of an accident.

Inflatable restraint devices known in the art provide a cushion for absorbing the forces imparted to the occupant in the event of an accident, but do not provide any means for opposing the forces imparted to the occupant at the instant of rapid deceleration of the vehicle. By providing a system for opposing the forces imparted to the occupant, the destructive forces of a collision can be distributed over time and the forces absorbed by the occupant at the point of impact with the airbag can be reduced. Thus, it would be advantageous to provide an occupant restraint system that actually provides a controlled force against the occupant to oppose the motion of the occupant caused by the rapid deceleration of the vehicle while deploying an airbag, thereby reducing the magnitude of the force absorbed by the occupant at the point of impact with the airbag.

SUMMARY OF THE INVENTION

The present invention discloses an inflatable restraint system including a restraint module for being disposed adjacent to the chest area of a vehicle occupant to provide an inflatable shock absorbing cushion adjacent to the occupant while simultaneously exerting a controlled force against the occupant in a direction opposite the direction of motion of the occupant Accordingly, the restraint system of the present invention includes a module housing an inflatable bag and a controlled high pressure gas generator, providing an explosive force upon extremely rapid deceleration or a crash of the vehicle, to deploy the inflatable bag adjacent to the vehicle occupant and to simultaneously generate a reactionary force against the occupant. The reactionary force created by the high pressure gas generator of the invention generates a controlled force against the occupant in a direction opposite the direction of motion of the occupant, thereby increasing the amount of time before the occupant impacts with the inflatable bag and decreasing the magnitude of the force absorbed by the occupant at the moment of impact with the airbag. Embodiments of present invention are disclosed which are useful in protecting against both frontal and lateral impact in either the front or rear seat, as well as an embodiment for a child seat. Yet another embodiment discloses a preinflated cushion within the inflatable bag which accelerates bag inflation and provides back-up cushioning in the event of system failure.

DESCRIPTION OF THE DRAWINGS

Other features and advantages of the invention will be apparent from the following detailed description of the invention in conjunction with the accompanying drawings, in which.

DETAILED DESCRIPTION OF THE INVENTION

Figure 1:
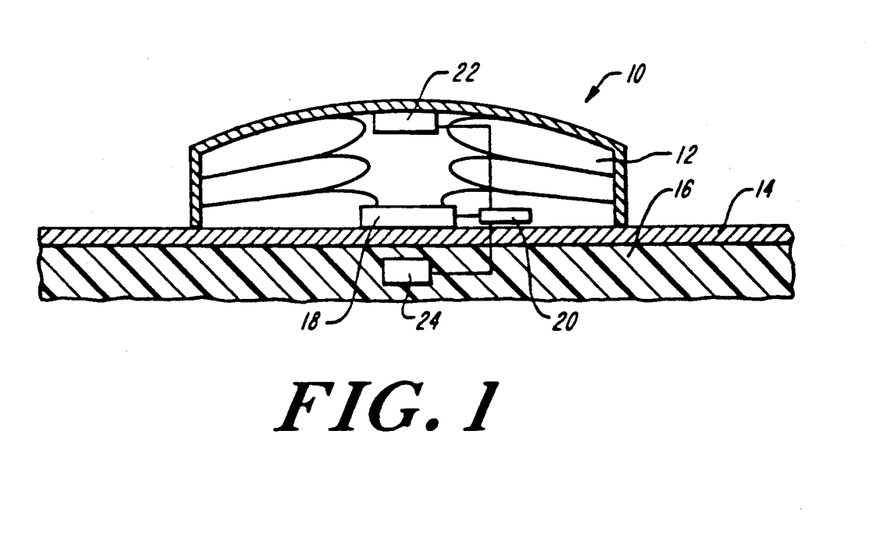
FIG. 1 is a cross-sectional view of the restraint module of the present invention.

Referring now to FIG. 1, the airbag restraint system of the present invention is embodied in a restraint module 10 including an airbag 12, shown in its collapsed state, mounted on a rigid membrane 14 adjacent to a protective cushion 16. A high pressure gas generator 18 is mounted within the module 10, adjacent to the rigid membrane 14 and coupled to an energy source 20 via a motion sensor 22. In addition, or alternatively, the high pressure gas generator 18 is also coupled to a pressure sensor 24 embedded in the protective cushion 16 and/or an impact sensor 26 (shown in FIG. 2) located on the vehicle in which the occupant is seated.

Figure 2:
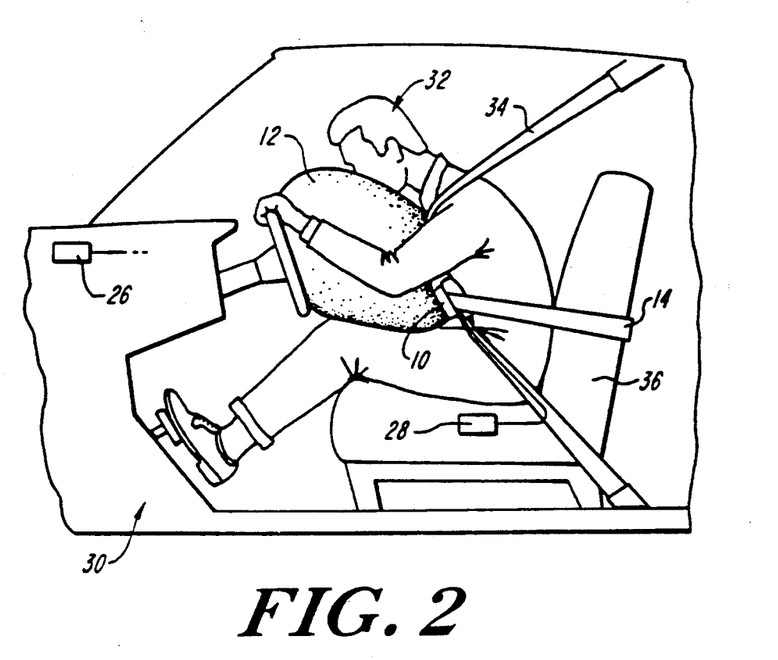
FIG. 2 is a side view showing the occupant restraint system of the present invention in its deployed state.

The module 10 is preferably a stand-alone module which can be mounted on a restraining harness in a vehicle, as shown in FIG. 2, or can be disposed on a vest worn by the vehicle occupant. This stand-alone feature allows the flexibility to manufacture and distribute customized airbag restraint systems in accordance with the invention, providing maximum individual comfort and protection for each individual depending on the size and weight of the individual.

Referring now to FIG. 2, there is shown a vehicle 30 with an occupant 32 seated within a shoulder harness 34 in a seat 36. The occupant restraint system of the present invention is shown in its deployed state with airbag 12 inflated to provide an impact absorbing cushion between the occupant 32 and the interior of the vehicle 30. Although the occupant restraint system is shown in conjunction with an automobile, it is contemplated that the present invention can be adapted for use in various passenger vehicles including trains and airplanes.

In operation, the high pressure gas generator 18 is triggered upon very rapid deceleration or crash of the vehicle 30 to generate a transient explosive force. The transient force generated thereby is transmitted throughout the restraint module 10 to create a controlled force against the rigid membrane 14 in a direction opposite the forward motion of the vehicle occupant 32 caused by the rapid deceleration of the vehicle, while simultaneously deploying the airbag 12 from the restraint module 10 into the area immediately adjacent to the occupant 32. The high pressure gas generator 18 may take the form of one of various known systems which may include a self-contained $CO_2$ cartridge or some known chemical discharge mechanism.

High pressure gas generator 18 is triggered by an output signal generated by motion sensor 22, pressure sensor 24, or impact sensor 26, similar to those presently known and in use in the art. A redundant triggering system is contemplated wherein the motion sensor 22, detecting the occupant's rate of movement, the pressure sensor 24, detecting the pressure exerted by the occupant against the module 10, and the vehicle impact sensor 26, detecting vehicle integrity, are each coupled to the high pressure gas generator 18 for providing an output signal thereto.

Figure 3:
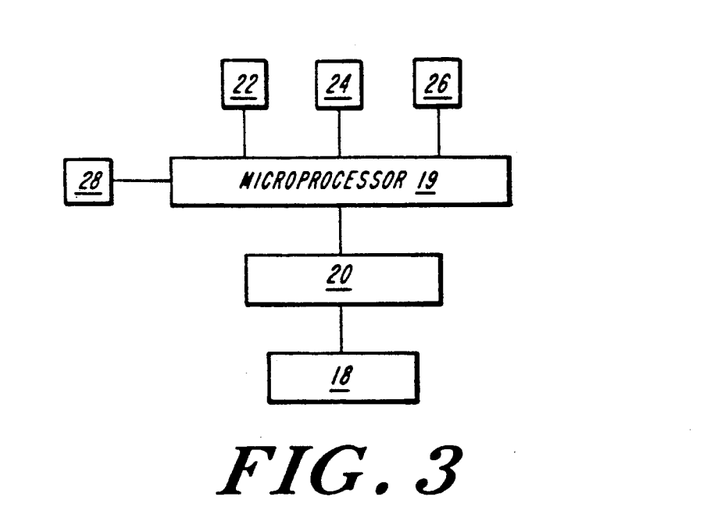
FIG. 3 is a block diagram of an interdependent sensing and arming system for triggering the present invention.

In the interest of providing a dependable deployment of the airbag 12 while preventing accidental deployment thereof, the sensors 22, 24, 26 can be configured to operate interdependently. For example, sensors 22, 24, 26 can be connected in series or can be coupled to the high pressure gas generator 18 via a microprocessor 19, in a configuration as shown in FIG. 3, wherein the microprocessor can be programmed so that the high pressure gas generator 18 will be triggered only if all three sensors 22, 24, 26 generate an output signal or if a combination of at least any two sensors detects a triggerable condition to generate an output signal. Of course, the restraint system can also be configured to be deployed in response to an output signal from a single sensor 22, 24, or 26.

An interlock arming system including a weight sensor 28 is also provided as a means for preventing accidental deployment of the airbag 12. The arming system is coupled to the high pressure gas generator 18 for detecting a predetermined weight, representing the presence of an occupant in the vehicle seat 36. This weight must be detected in order to "arm" the high pressure gas generator 18 so that it can be triggered by the sensors 22, 24, and/or 26. The interlock arming system may also include a manual switch which may be incorporated into a typical seatbelt buckle. The interlock arming system can also be coupled to the microprocessor 19 triggering system, as shown in FIG. 3.

Figure 4:
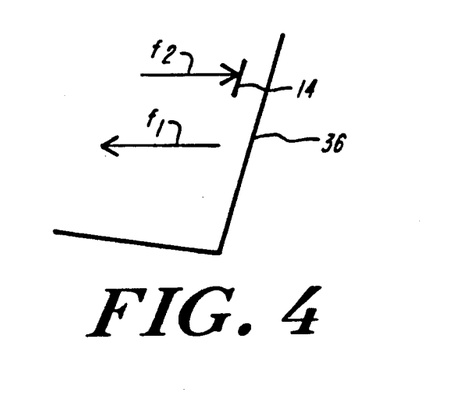
FIG. 4 is a schematic diagram showing the forces acting on the occupant at the moment that the present invention is deployed.

The advantages of the present invention can be best appreciated by representing the forces acting on the vehicle occupant 32 in schematic form as shown in FIG. 4. Force $f_2$ represents the reactionary force generated against the occupant 32 by the present restraint system. Force $f_2$ is directly opposite the force $f_1$ created by the rapid deceleration of the vehicle 10. The representative forces shown in FIG. 4 can be further reduced to basic physical equations to provide an explanation of the advantages provided by the present invention.

In the following description, it is assumed that the distance d that an occupant 32 travels within the vehicle compartment as the result of rapid deceleration of the vehicle will be constant for a given occupant of mass m. In reality, the present invention may actually reduce the distance that the occupant 32 will travel, resulting in a further reduction of the force $f_1$ acting on the occupant 32. The approach presented herein offers a conservative mathematical analysis for illustrative purposes only.

It is given through the laws of physics that velocity v is equal to distance d divided by time t and that force F is equal to velocity v times mass m as expressed in the following mathematical equations, respectively:

$$v = d/t; \quad d = vt \tag{1}$$

$$F = v \times m \tag{2}$$

Thus, the velocity and force generated by an occupant as it is accelerated in a rapidly decelerating vehicle is given by equations (1) and (2).

Applying a force $f_2$ in a direction opposing the acceleration of the occupant 32, as provided by the present invention, the time t that it takes for the occupant's body to travel the distance d from its position at rest to the point of impact with the airbag 16 is increased. Assuming the force exerted on the occupant 32 by the present invention increases the time to impact with the airbag by a factor of two, the velocity of the occupant's body utilizing the restraint system of the present invention becomes:

$$V_b = d/2t \tag{3}$$

Since the distance d that the occupant travels remains constant, equation (1) can be substituted into equation (3) to show that by using the restraint system of the present invention, the velocity $V_b$ of the occupant as it impacts the airbag is:

$$V_b = vt/2t = v/2 \tag{4}$$

Substituting the value for $V_b$ into the force equation:

$$F_b = V_b \times m = v/2 \times m = F/2 \tag{5}$$

Thus, it can be seen from this mathematical derivation that the force acting on an occupant 32 in a vehicle 10, during rapid deceleration thereof can be reduced in direct relationship to an increase in the amount of time to impact with the airbag 12. This increase in time is effected by the reactionary force generated by the restraint system of the present invention.

Figure 5:
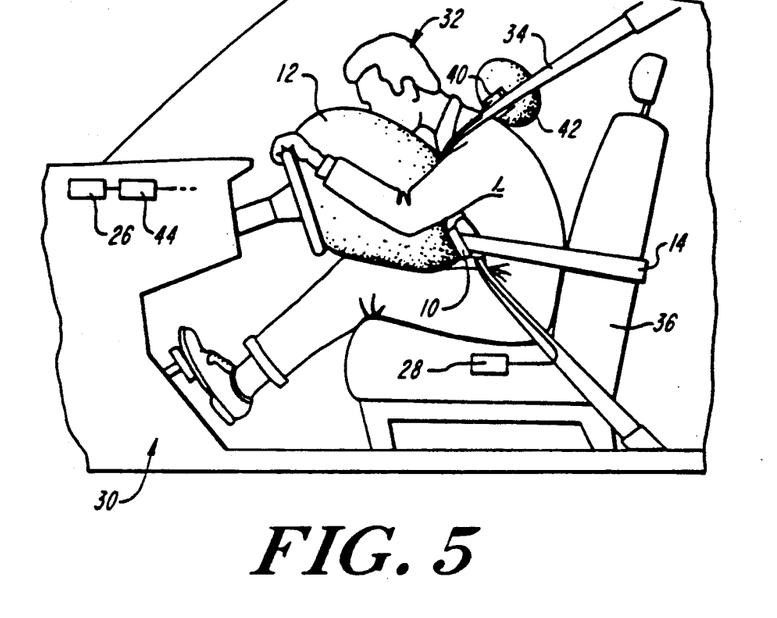
FIG. 5 is a side view showing an embodiment including a head protection restraint for use in conjunction with the forward airbag of the present invention.

A second embodiment of the present invention is illustrated in FIG. 5 wherein an ancillary restraint module 40 is positioned behind the base of the neck of the occupant 32. As in the embodiment described hereinabove, the ancillary restraint module 10 provides a reactionary force against the acceleration of the occupant's body while simultaneously deploying an airbag 42. In this embodiment, however, a delay mechanism 44 is coupled between the ancillary module 40 and the vehicle sensor 26 so that the ancillary module is triggered at a predetermined time after the triggering of the primary restraint module 10.

Figure 6:
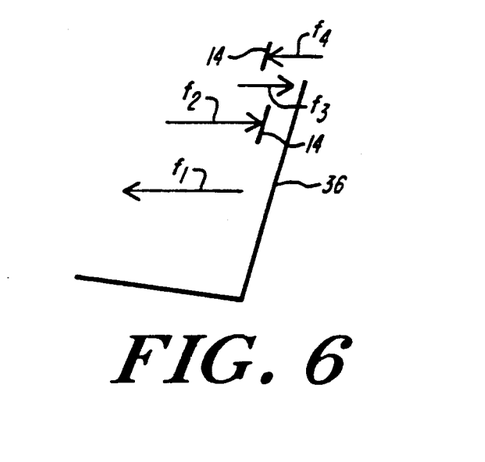
FIG. 6 is a schematic diagram showing the forces acting on the occupant in the embodiment of FIG. 5.

As shown in FIG. 6, this second embodiment generates a force $f_4$ to counteract the force $f_3$ acting on the occupant's head generated by the impact of the occupant 32 with the primary airbag 12. It follows, therefore, from the above mathematical derivation, that the reactionary force $f_4$ generated by the ancillary module 40 further reduces the forces exerted against the occupant's neck and thereby reducing whiplash effects on the occupant 32. The dual airbag system shown in FIG. 5 operates to dampen both the forward and rearward movement of the occupant in a severe accident, decreasing the impact forces acting on the occupant 32. The combination of reactionary forces $f_2$ and $f_4$ provided by this dual airbag system can be adapted to the mass and velocity of the occupant being protected that the present invention provides an adaptive restraining system which conforms to the severity of the forces acting on the occupant.

Figure 7:
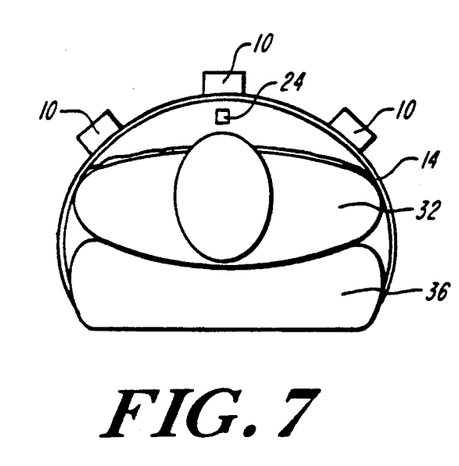
FIG. 7 is a top view viewing showing an embodiment of the present invention utilizing a plurality of restraint modules.

As shown in FIG. 7, the restraint system of the present invention can also be implemented via a plurality of restraint modules 10 disposed across the body of an occupant 32 along a rigid membrane 14, providing multiple independent airbags adjacent to the occupant. This configuration of multiple restraint modules 10 provides additional side protection to the occupant 32 as well as a distribution of the reactionary forces acting against the occupant 32.

Figure 8:
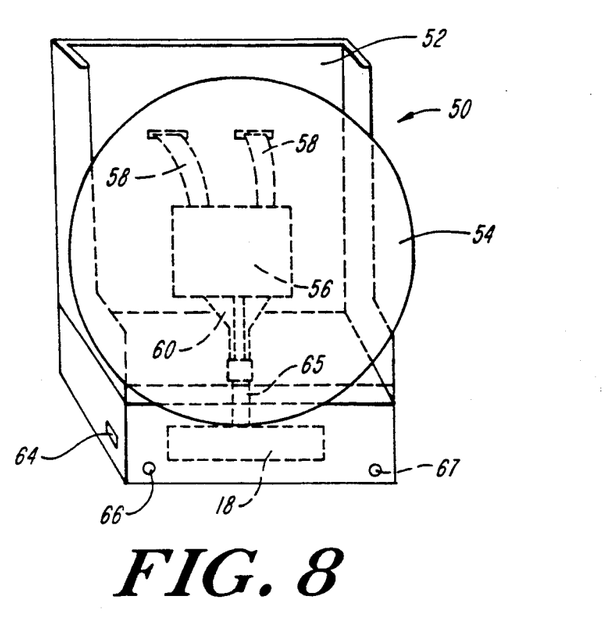
FIG. 8 is a perspective view of a child seat incorporating the restraint module of the present invention in its deployed state.

A third embodiment of the occupant restraint, suitable for protection of a child, is show in FIG. 8, wherein a child safety seat 50 combines a child sized seat 52 having straps 58 and a pad 60 similar to those in the present art, with the superior impact protection of an airbag 54 deployed from a restraint module 56 which produces reactionary forces. The restraint module 56 may be attached to the seat 52 as an aftermarket add-on, as a vehicle independent seat manufactured with the restraint module 56 or as a seat having a restraint module 56, but vehicle dependent for either acceleration sensing or airbag inflation.

The restraint module 56 when used as an aftermarket add-on to prior art child seats is entirely self contained. The restraint module 56 contains the airbag 54, acceleration sensors 61, the high pressure gas generator 18, and optional microprocessor 19 as described with respect to FIGS. 1-3. It should be understood that the high pressure gas generator 18 may be, but is not necessarily, a gas filled cylinder. It may be a device for releasing highly compressed gas, gas formed from rapidly combining chemicals, or gas produced in a pyrotechnic discharge. The restraint module 56 is attached to the straps 58 and/or pad 60 which serve to restrain the child within the seat 52. Alternatively, the straps 58 and/or pad 60 of the seat 52 may be removed and replaced with an aftermarket system having straps 58 and/or a pad incorporating the restraint module 56. The resulting child safety seat 50, thus configured is triggered in response to a firing signal from an acceleration sensor 61 and/or a pressure sensor 63 mounted on or in the restraint module. Upon activation, the high pressure gas generator 18 generates reactionary forces against the occupant 32 during airbag 54 inflation as described with respect to FIG. 2.

In another embodiment, the child safety seat 50 is designed for manufacture as an integral, vehicle independent seat. In this embodiment the child safety seat 50 may have the high pressure gas generator housed in the body of the seat 52, either under the seat 52 as depicted in FIG. 8, behind it or to one of the sides. When activated, the rapidly expanding gas is conducted to the airbag 54 via an appropriately sized tube 65. Additionally, the child safety seat 50 has an arming switch 64 located in a position inaccessible to the child. The child safety seat 50 may be equipped with pressure or weight sensors (not shown) to prevent arming of an unoccupied seat and indicator flags or lights 66 which signal the activation state of the seat. For example, a red indicator light 66 indicates that the system is turned on, and a second green indicator light 67 then illuminates when the module 56 is secured in place and weight is on the seat.

Figure 9:
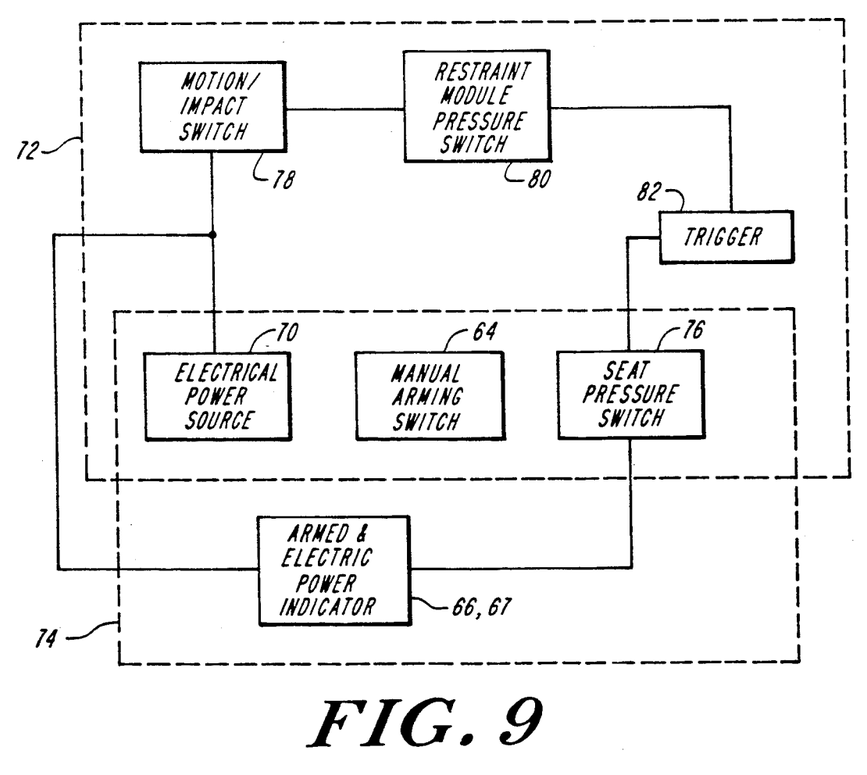
FIG. 9 is a block diagram of a sensing, arming and indicating system for use in the embodiment of FIG. 8.

FIG. 9 illustrates the circuit logic for electrical arming of the child safety seat 50 and is useful in describing the operation and activation of the seat. An electrical power source 70, such as a battery powers both a trigger circuit 72 and an arming status circuit 74. The trigger circuit 72 has several points of interruption on each side of the circuit 72 which act as safety features to prevent inadvertent airbag 54 deployment. To complete one side of the trigger circuit 72, which outputs a signal to activate the high pressure gas generator 18, the manual arming switch 64 must be in the "on" or contact position and the seat pressure switch 76 closed, due to an occupant 32 in the child safety seat 50. The other side of the trigger circuit 72 is completed when the motion/impact switch 78, as described more fully with respect to FIGS. 1 and 2, and the restraint module pressure switch 80 are closed. Thus, when both sides of the trigger circuit 72 are closed, electrical current flows to the trigger 80 which activates the high pressure gas generator 18. A wide variety of switches are compatible with this invention, with solid state switches and piezoelectric pressure sensors having particular applicability.

The arming status circuit 74 provides an indication to the person placing an infant into the child safety seat 50 whether the seat 50 is armed or not. The arming status circuit 74 provides power to the red 66 and green 67 indicator lights when the manual arming switch 64 is on and the seat pressure switch 76 is closed.

Figure 10:
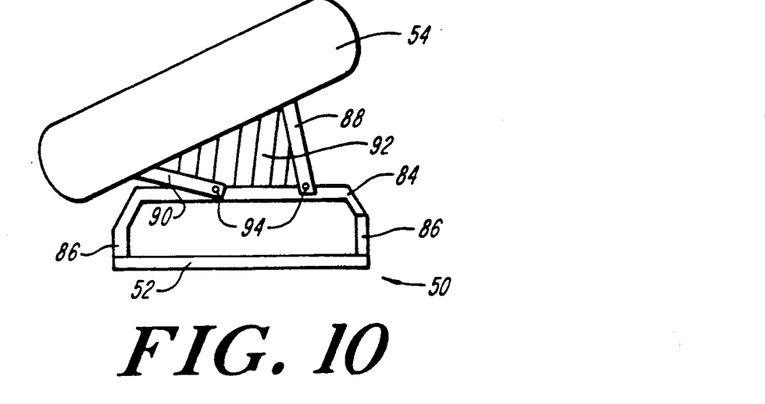
FIG. 10 is a top view of the device of FIG. 8 incorporating an adjustable restraint module which affords enhanced lateral protection.

Referring now to FIG. 10, a top view of an embodiment of the child safety seat 50 is shown with a modification to enhance protection of the occupant 32 from lateral impacts. In this embodiment, the seat 52 has, in addition to straps 58 and/or a pad 60, a rail or tray 84 extending out from the sides 86 of the seat 52 which passes in front of the occupant's torso. The restraint module 56 being flexibly attached to one end of each telescoping arm 88 and 90 along the back or sides of the restraint module 56 with a mechanical hinge, pivot joint, or elastomeric material, is attached to the rail or tray 84 with the other end of each telescoping arm 88 and 90 with lockable pivot joints 94 which allow the restraint module 56 to be oriented to the right, left or center of the child safety seat 50. Alternatively, the telescoping arms 88 and 90 may be attached directly to the seat 52, thus obviating the need for a supplemental rail or tray 84. Additionally, either an elastomeric pad 92 may be placed between the telescoping arms 88 and 90 on the back of the restraint module 56, or the airbag 54 may be shaped to inflate rearward around and between the arms.

In FIG. 10 the restraint module 56 is positioned to the left to better protect the occupant 32 in the left rear seat from left side impact. When the child safety seat 50 is installed on the right side of a vehicle, in either the front or rear seat, the restraint module 56 is swung to the right side and locked into position. When moving from side to side the telescoping arms 88 and 90 are free to extend and retract as required for movement, but when the restraint module 56 is aligned as desired, an internal mechanism (not shown) is engaged to fix the length of the arms 88 and 90 when the pivot joints 94 are locked. For use in the center of a front or rear seat when lateral impact protection might not be a primary consideration, the arms 88 and 90 are retracted an equal amount to center the restraint module 56 which then operates in the manner described with respect to FIG. 8.

Figure 11:
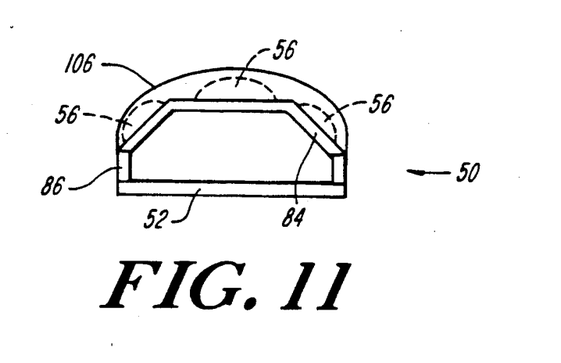
FIG. 11 is a top view of the device of FIG. 8 incorporating multiple restraint modules for enhanced lateral protection.

With reference to FIG. 11, another embodiment of the present invention is shown for protection of an occupant 32 from lateral impact. A seat 52, having sides 86 and rail or tray 84, is depicted with three restraint modules 56 affixed to the rail or tray 84. The restraint modules 56 are shown encased in a optional lightweight rail cushion 106 which serves to protect the restraint modules 56 and to provide low cost aesthetic variation. The restraint modules 56 in this figure are completely self contained and incorporate multi-axis acceleration sensors 61 which are responsive to both frontal and lateral impacts, an airbag 54 and a high pressure gas generator 18. As with the child safety seat of FIG. 8, this embodiment using self-contained restraint modules 56 is suitable for sale in the aftermarket.

Figure 12:
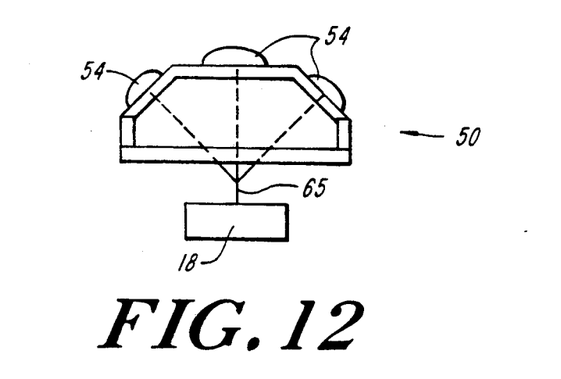
FIG. 12 is a further embodiment of the device of FIG. 11.
Figure 13:
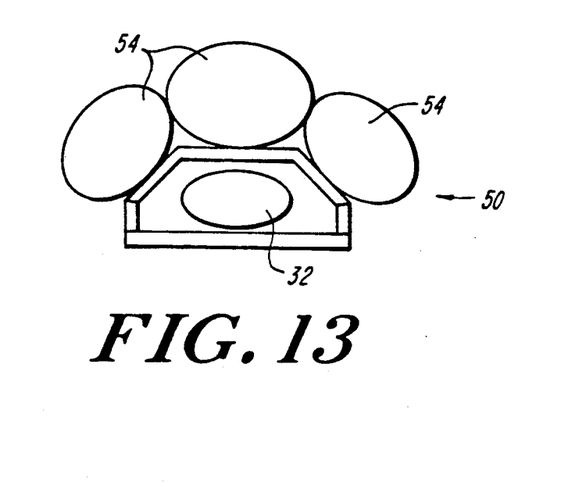
FIG. 13 is a top view of the device of FIGS. 12 and 13 in its fully deployed state.
Figure 14:
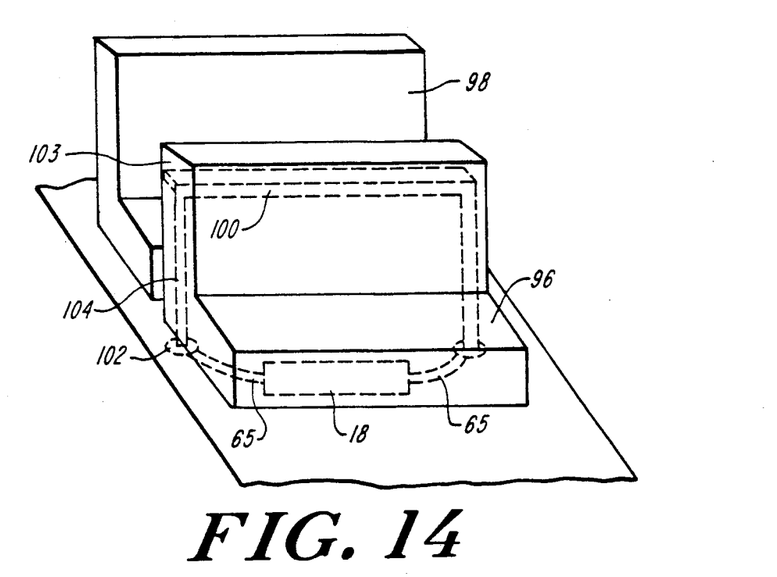
FIG. 14 is a perspective view of an embodiment of the present invention for protection of rear seat occupants.

FIG. 12 depicts a child safety seat 50 with a single high pressure gas generator 18 in communication with three airbags 54 mounted on the rail or tray 84. In this figure, the optional rail cushion 106 is not installed. The child safety seat of FIG. 12 includes sensors 61 and microprocessor 19 (not shown) in addition to the high pressure gas generator 18, as more fully described with respect to FIG. 9. While the drawing depicts a single tube 65 which is has branches going to each airbag 54 from the high pressure gas generator 18, completely individual tubes 65 connected to individual high pressure gas generators 18 may be employed. It is also contemplated that gas output be sequentially directed by the microprocessor 19, as a function of impact direction, through a control valve or valves (not shown) so as to inflate one or more airbags 54 prior to the others. Alternatively, the tubes 65 run from one airbag 54 to the others where, for example, the center airbag 54 upon inflating to its predetermined fill volume, directs the continued influx of gas to the left and right side airbags 54. This order can be altered either through programming of the microprocessor 19 with a simple user control pad (not shown) on the seat designating center, left or right airbag 54 inflation priority. As with the other embodiments, each restraint module 56 generates reactionary forces. Thus, when multiple restraint modules 56 are employed, multiple reactionary forces are generated along the appropriate axis to retard the movement of the occupant 32 into the airbags 54. FIG. 13 depicts the child safety seat 50 with all three airbags 54 inflated to surround the occupant 32. The integral, and therefore portable, child safety seat 50 thus described may be used in any type of conveyance, such as airplanes, buses, trains or trucks, where a frontal or lateral impact protection system is not available or needs to be supplimented. With respect now to FIG. 14 another embodiment of the inflatable occupant restraint is shown for use in a rear seat of a vehicle. This embodiment is primarily intended as a self-contained aftermarket addition to taxis and limousines, but is equally useful for private automobile use as well as in airplanes, helicopters, trains and buses. FIG. 14 depicts the interior of a car with front 96 and rear 98 bench style seats. Behind the front seat 96 an elongated restraint module 56 is incorporated into a restraint rail 100. The restraint rail 100 may be tilted forward towards the front seat 96 to allow passenger ingress, and then tilted back over the passenger's lap or in close proximity to the torso of the passenger. It is envisioned that a work surface 103 can be detachably affixed to the restraint rail 100 as desired. The rail 100 may be articulated at the floor level of the vehicle or at any point along the side tubes 104 of the restraint rail 100 with hinges 102. Furthermore, the high pressure gas generator 18 may be located in one of the side tubes 104 or high pressure gas generators 18 may be placed in each, both of which responsive to the trigger 82 of the trigger circuit 72. Supplemental floor mounted pressure sensors 106 may also be incorporated as shown to inhibit inadvertent system activation.

Inflation of the airbag 54 is triggered, and reactive forces are generated in the same manner as described with respect the preceding embodiments. When inflation of the airbag 54 is triggered, the airbag inflates away from the occupant 32, thus pushing the restraint rail 100 and optional work surface 103 away from the occupant, flush against the front seat back or into a recess designed to receive it.

Figure 15:
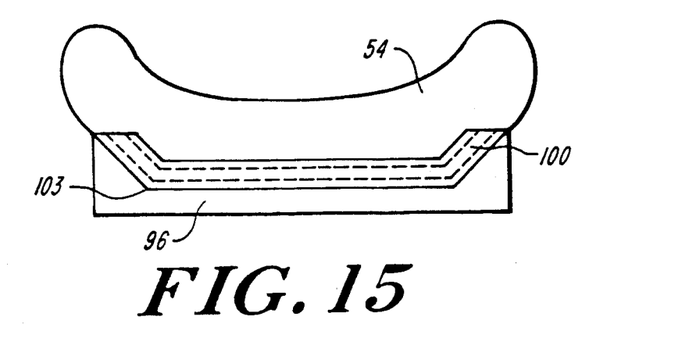
FIG. 15 is an overhead view of the embodiment of FIG. 11 in its deployed state.

FIG. 15 is an overhead view of the inflatable occupant restraint described in FIG. 14 with its airbag 54 deployed. In this view the restraint rail 100 containing the restraint module 56 is shown with work surface 103 installed, pushed forward into a recess in the back of the front seat 96. The airbag 54 is shaped so that when inflated, the sides of the airbag 54 inflate between the occupant 32 and the vehicle side for enhanced protection from lateral impact. It is important to note that in this embodiment, as with the others, the restraint module 56 is positioned sufficiently close to the occupant 32 (or occupants) so that the reactive forces serve to attenuate impact forces in addition to providing the cushioning of the airbag 54.

Figure 16:
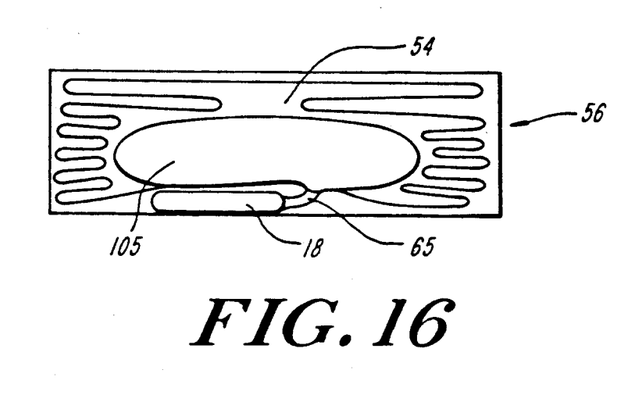
FIG. 16 is a cross-sectional view of an embodiment of the present invention having a preinflated cushion within the airbag prior to deployment.
Figure 17:
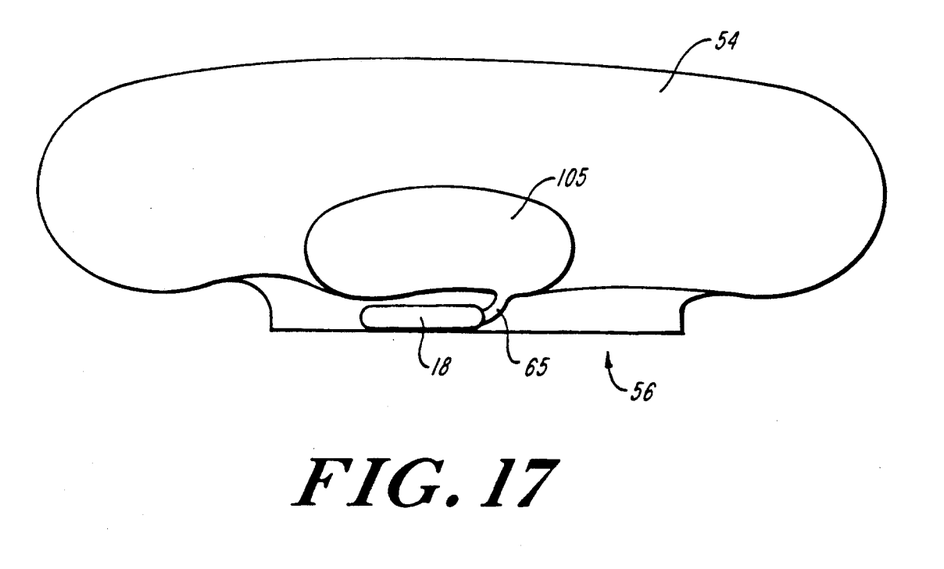
FIG. 17 is a cross-sectional view of the embodiment of FIG. 13 after deployment.

Turning now to FIG. 16, another embodiment of the restraint module 56 of the present invention is shown, wherein the uninflated airbag 54 contains, and is packed inside the restraint module 56 around, a preinflated cushion 105. The preinflated cushion 105 provides a portion of the inflation gas to the airbag 54 as a function of the volume it displaces within the airbag 54. The remainder of the gas is furnished by the high pressure gas generator 18 upon triggering of the system. The preinflated cushion 105 may be connected directly to tube 65 which is the gas conduit from the high pressure gas generator 18. In this arrangement, the sudden influx of gas causes the preinflated cushion 105 to burst, thus releasing both the "old" gas from the preinflated cushion 105 and the "new" gas from the high pressure gas generator into the airbag 54. In a different arrangement, the tube 65 is routed directly into the airbag 54, bypassing the preinflated cushion 105, and results in an inflated airbag 54 with an intact preinflated cushion 105 inside of it as depicted in FIG. 17. In the event of system failure, the preinflated cushion 105 within the restraint module 56 provides partial protection of the occupant 32 subjected to impact forces.

The presently described integral inflatable restraint system is illustrative of a novel apparatus for providing dynamic protection for the occupants of a moving vehicle. It will be appreciated that other modifications, embodiments and departures from the present disclosure are possible without departing from the inventive concept contained herein. Consequently, the invention is to be viewed as embracing each and every novel feature as well as any novel combination of features present in, or possessed by, the inflatable restraint system disclosed herein and is to be limited solely by the scope and spirit of the appended claims.

What is claimed is:

1. A child safety seat incorporating an inflatable restraint system for protecting an occupant of said child safety seat in a moving vehicle upon rapid deceleration thereof, comprising:
   a child seat, wherein said child seat is adapted for use in said moving vehicle;
   at least one restraint module mounted on said child seat adjustably disposed adjacent to said occupant, said at least one restraint module comprising:
   an inflatable bag for deployment from said at least one restraint module in a direction away from said occupant;
   a high pressure gas generator for inflating said inflatable bag and for exerting a reactionary force against said occupant in a direction opposite the direction of inflation of said inflatable bag;
   at least one sensor means, coupled to said high pressure gas generator for providing an output signal to trigger said inflation upon detection of a predetermined event.

2. The child safety seat of claim 1, further including: a cushion being disposed between said module and said occupant for dispersing said reactionary force generated by said high pressure gas generator.

3. The child safety seat of claim 1 wherein said at least one sensor means includes:
   at least one motion sensor coupled to said at least one restraint module for detecting acceleration of said occupant to provide said output signal to said high pressure gas generator upon detection of a predetermined magnitude of acceleration.

4. The child safety seat of claim 1 wherein said at least one sensor means includes:
   at least one impact sensor means coupled to said vehicle for detecting an impact force against said vehicle to provide said output signal to said high pressure gas generator upon detection of a predetermined magnitude of impact force.

5. The child safety seat of claim 1 wherein said at least one sensor means includes:
   at least one pressure sensor coupled to said at least one restraint module for detecting pressure between said at least one restraint module and said occupant to provide said output signal to said high pressure gas generator upon detection of a predetermined magnitude of pressure.

6. The child safety seat of claim 1, further including:
   microprocessor means coupled between said at least one sensor means and said high pressure gas generator, said microprocessor means being programmable to provide a trigger signal to said high pressure gas generator in response to said output signal from any one of said at least one sensing means.

7. The child safety seat of claim 1, further including:
   microprocessor means coupled between said at least one sensor means and said high pressure gas generator, said microprocessor means being programmable to provide a trigger signal to said high pressure gas generator in response to said output signal from a predetermined plurality of at least one sensing means.

8. The child safety seat of claim 1, further including:
   arming means for engaging and disengaging said at least one sensor means to prevent accidental activation thereof.

9. The child safety seat of claim 8, further including:
   microprocessor means coupled between said at least one sensor means, said arming means and said high pressure gas generator;
   said microprocessor means being programmable to provide a trigger signal to said high pressure gas generator in response to an engagement signal from said arming means and said output signal from any one of said at least one sensing means.

10. The child safety seat of claim 8, further including:
    microprocessor means coupled between said at least one sensor means, said arming means and said high pressure gas generator;
    said microprocessor means being programmable to provide a trigger signal to said high pressure gas generator in response to an engagement signal from said arming means and said output signal from a predetermined plurality of said at least one sensing means.

11. The child safety seat of claim 8, wherein said arming means includes manual switch means to engage and disengage said sensor means.

12. The child safety seat of claim 8, wherein said arming means includes a pressure switch means for detecting the presence of said occupant to engage said sensor means in response to the detection of said occupant.

13. The child safety seat of claim 1, further including a shoulder harness disposed over the upper torso of said occupant, said at least one restraint module being disposed thereon.

14. The child safety seat of claim 1, having a restraining pad coupled to a shoulder harness, said at least one restraint module being disposed thereon.

15. The child safety seat of claim 1, wherein said child safety seat is easily removable from said vehicle.

16. The child safety seat of claim 1, wherein said child safety seat is adapted for permanent installation in said vehicle.

17. The child safety seat of claim 1, wherein said child safety seat further comprises:
   a first telescoping arm flexibly attached to said at least one restraint module for pivotally connecting said restraint module to said child seat or an extension thereof;
   a second telescoping arm flexibly attached to said at least one restraint module for pivotally connecting said restraint module to said child seat or an extension thereof; and
   a locking means for stabilizing an axial orientation of said at least one restraint module.

18. The child safety seat of claim 17, wherein said extension is a rail.

19. The child safety seat of claim 1, wherein said high pressure gas generator is pyrotechnic.

20. The child safety seat of claim 1, wherein said high pressure gas generator is highly compressed gas.

21. The child safety seat of claim 1, wherein said high pressure gas generator is a rapid chemical reaction.

22. The child safety seat of claim 1, further including:
   a preinflated cushion disposed inside said inflatable bag, said inflatable bag having an approximate full inflation volume, for reducing an inflation rate of said inflatable bag by releasing
   into said inflatable bag a portion of said full inflation volume of a gas upon triggering said high pressure gas generator, and for further providing a cushion in the event of failure of said inflatable restraint system.

23. A vehicle independent child safety seat comprising:
   a plurality of inflatable bags for deployment in a direction away from an occupant of said vehicle;
   a mounting means for holding said plurality of inflatable bags adjacent said occupant;
   at least one high pressure gas generator for inflating said plurality of inflatable bags and for exerting a reactionary force against said occupant in a direction opposite the direction of inflation of each said plurality of inflatable bags;
   a control means responsive to at least one sensor means and a system user for directing high pressure gas from said at least one high pressure gas generator to said plurality of inflatable bags in a predetermined sequence; and
   at least one sensor means, coupled to said control means and said high pressure gas generator for providing an output signal to trigger said inflation upon detection of a predetermined event.

24. The vehicle independent child safety seat of claim 23 wherein said predetermined event is a frontal impact upon said vehicle.

25. The vehicle independent child safety seat of claim 23 wherein said predetermined event is a lateral impact upon said vehicle;

26. The vehicle independent child safety seat of claim 23 wherein said predetermined event is a vehicle crash 27. The vehicle independent child safety seat of claim 23, further including:
   a preinflated cushion disposed inside each of said plurality of inflatable bags, each of said plurality of inflatable bags having an approximate full inflation volume, for reducing an inflation rate of each of said plurality of inflatable bags by releasing into each of said plurality of inflatable bags a portion of said full inflation volume of a gas upon triggering said at least one high pressure gas generator, and for further providing a cushion in the event of failure of any of said plurality of inflatable bags to deploy.

28. A vehicle independent inflatable passenger restraint system comprising:
   at least one inflatable bag for deployment in a direction away from an occupant of said vehicle;
   a high pressure gas generator for inflating said at least one inflatable bag and for exerting a reactionary force against said occupant in a direction opposite the direction of inflation of said at least one inflatable bag;
   at least one sensor means, coupled to said high pressure gas generator for providing an output signal to trigger said inflation upon detection of a predetermined event;
   an articulated structure mounted to a portion of said vehicle, 13 wherein said articulated structure includes said at least one inflatable bag, and is positionable adjacent said occupant.

29. The passenger restraint of claim 23, further including:
   a preinflated cushion disposed inside each of said at least one inflatable bag, said at least one inflatable bag having an approximate full inflation volume, for reducing an inflation rate of said at least one inflatable bag by releasing into said at least one inflatable bag a portion of said full inflation volume of a gas upon triggering said high pressure gas generator, and for further providing a cushion in the event of failure of said inflatable restraint system.

* * * * *